United States Patent
Christudass et al.

(10) Patent No.: US 9,112,810 B2
(45) Date of Patent: Aug. 18, 2015

(54) DEVICE DISCOVERY SERVICE

(75) Inventors: John J. Christudass, Coppell, TX (US); Abhilash Paul, Irving, TX (US); Sunil D. Limbasia, Irving, TX (US); Ravi Penumatsa, Irving, TX (US); Aravind Perumandla, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 104 days.

(21) Appl. No.: 13/613,020

(22) Filed: Sep. 13, 2012

(65) Prior Publication Data

US 2014/0075488 A1   Mar. 13, 2014

(51) Int. Cl.

| | |
|---|---|
| *H04N 7/173* | (2011.01) |
| *H04N 7/16* | (2011.01) |
| *H04L 12/24* | (2006.01) |
| *G06F 9/445* | (2006.01) |
| *H04L 12/28* | (2006.01) |
| *H04N 21/436* | (2011.01) |
| *H04N 21/442* | (2011.01) |
| *G06F 9/50* | (2006.01) |

(52) U.S. Cl.
CPC ............ *H04L 41/5058* (2013.01); *G06F 9/445* (2013.01); *G06F 9/5005* (2013.01); *H04L 12/2809* (2013.01); *H04N 21/43615* (2013.01); *H04N 21/44227* (2013.01)

(58) Field of Classification Search
CPC ............ H04L 12/2809; H04L 41/5058; H04L 12/2834; H04L 67/16; H04N 21/43615; H04N 21/4586; H04N 7/17318; H04N 21/44227
USPC ............. 725/38–91; 370/11–20; 726/25, 114; 709/203
See application file for complete search history.

(56) References Cited

U.S. PATENT DOCUMENTS

| | | | | |
|---|---|---|---|---|
| 5,818,838 | A * | 10/1998 | Backes et al. | 370/390 |
| 5,961,586 | A * | 10/1999 | Pedersen | 709/201 |
| 2004/0163130 | A1* | 8/2004 | Gray et al. | 725/132 |
| 2006/0085232 | A1* | 4/2006 | Rice | 705/5 |
| 2007/0044156 | A1* | 2/2007 | Redmann | 726/25 |
| 2008/0127255 | A1* | 5/2008 | Ress et al. | 725/38 |
| 2010/0165957 | A1* | 7/2010 | Hegde et al. | 370/338 |
| 2011/0282931 | A1* | 11/2011 | Chen et al. | 709/203 |

* cited by examiner

*Primary Examiner* — Benjamin R Bruckart
*Assistant Examiner* — Jen-Shi Huang

(57) ABSTRACT

A network device receives, from a set-top box within a local network, a discovery request for a server application within the local network. The network device identifies, based on the discovery request, a wide area network (WAN) Internet Protocol (IP) address for a router in the local network and retrieves, from a database of multiple discovery records, a particular discovery record with an IP address that matches the WAN IP address for the local network. The network device sends, to the set-top box, the particular discovery record for use in initiating a communication session with the server application.

20 Claims, 6 Drawing Sheets

| RECORD NO. | ROUTER IP | LOCAL IP | PORT |
|---|---|---|---|
| 1 | 194.223.XX.YYY | 192.168.X.Y | 26 |
| 2 | 194.223.XX.YYY | 192.168.X.Z | 1 |
| 3 | 194.221.WW.YYY | 192.168.XX.YY | 1 |
| 4 | 194.221.XX.ZZZ | 192.168.XZX.YZY | 1 |

FIG. 5

DEVICE DISCOVERY SERVICE

BACKGROUND

Continued improvements to high speed networks have provided multiple avenues for consumers to access digital media. This increased access to content via multiple devices has driven a demand for device interoperability to enable consumers to easily view/share digital content on multiple devices. As one example, some network service providers offer media management services that allow customers to access digital media content from a local computer for presentation on a customer's television. For example, the media management services may allow a customer to access digital content, such as pictures, streaming media, home videos, etc., on a cable-ready television.

Some organizations, such as the Digital Living Network Alliance (DLNA), have developed standards for device interoperability that simplify the exchange of digital content between different devices. However, some new devices and legacy devices do not conform to such standards.

BRIEF DESCRIPTION OF THE DRAWINGS

FIG. 5 a diagram illustrating a portion of an exemplary data structure that may be used the discovery server of FIG. 2.

DETAILED DESCRIPTION OF PREFERRED EMBODIMENTS

The following detailed description refers to the accompanying drawings. The same reference numbers in different drawings may identify the same or similar elements.

Figure 1:
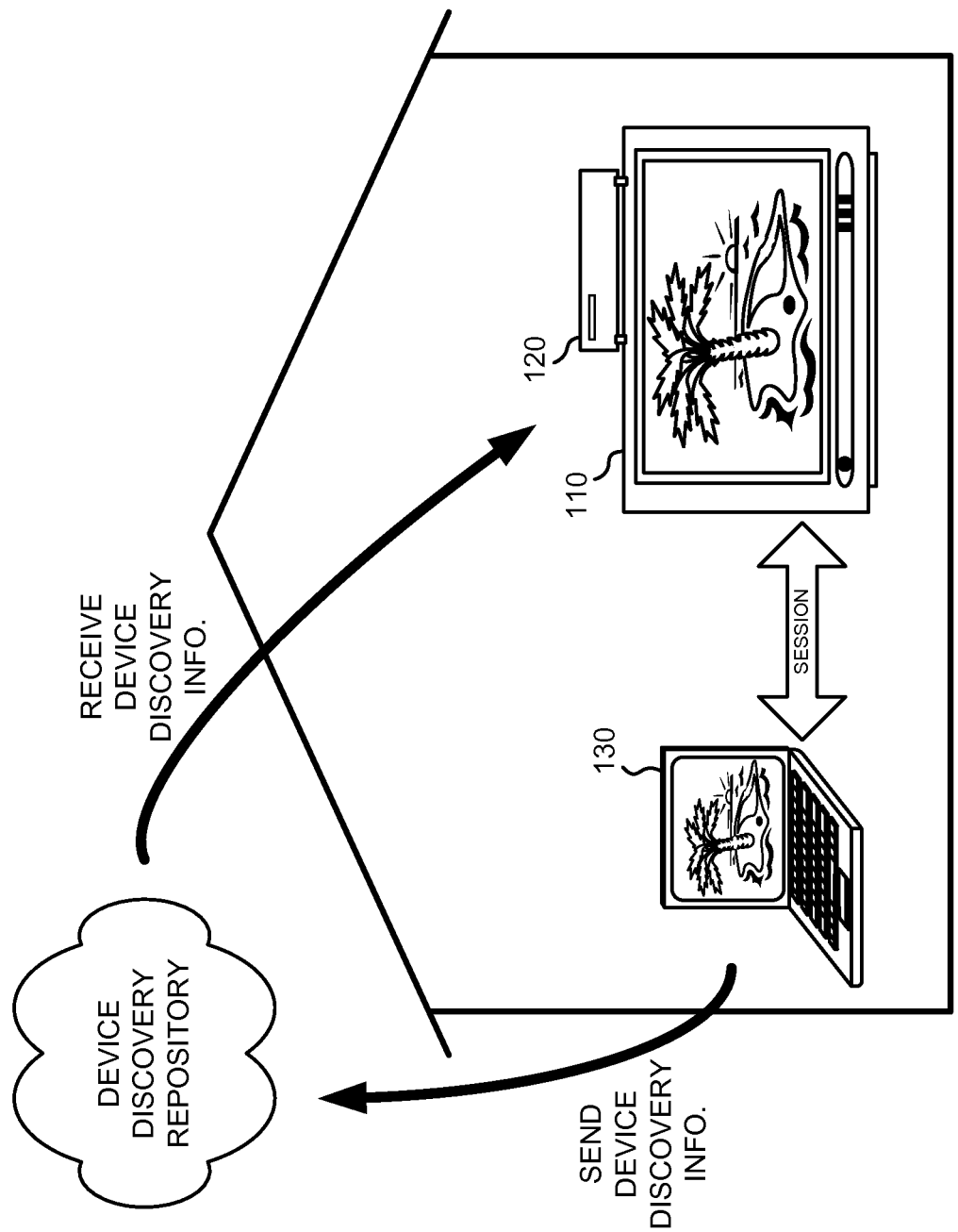
FIG. 1 is a diagram illustrating concepts described herein.

Systems and methods provided herein may enable a client application, residing on a set-top box (STB) within a home (or local) network, to discover a media manager server application residing on a computer within the same home network. FIG. 1 is a diagram illustrating concepts described herein. As shown in FIG. 1, a television display 110 may be connected to a set-top box (STB) 120 to provide broadcast and/or on-demand programming. A computing device 130 may also be configured to communicate with STB 120 (e.g., via a wired or wireless home network).

According to implementations described herein, computing device 130 may be equipped with a server application, and STB 120 may be equipped with a client application, that together enable STB 120 to retrieve and present, on television display 100, digital content from computing device 130. The client application on STB 120 may provide a user interface to enable a viewer to browse and retrieve digital content from computing device 130. Digital content may include, for example, content from a local memory of computing device 130 or streaming media from the Internet passed through computing device 130.

To provide an effective user experience, it may be desirable to have viewers of television display 110 be able to access content from computing device 130 without the server application on the computing device having to initiate a communication session from computing device 130. Instead, it is preferable to have the client device on STB 120 initiate the communication session (e.g., a TCP/IP session) with computing device 130 to retrieve digital content. According to implementations described herein, the server application on computing device 130 may provide discovery information, including a local IP address and port, to an off-site location, such as a device discovery repository. The client application on STB 120 may then access the off-site location to retrieve the discovery information and use the discovery information to initiate a session with computing device 130. STB 120 may, thus, discover local devices (such as computing device 130) within a customer's home network in a manner that is not reliant on DLNA-compliant devices or standards.

Figure 2:
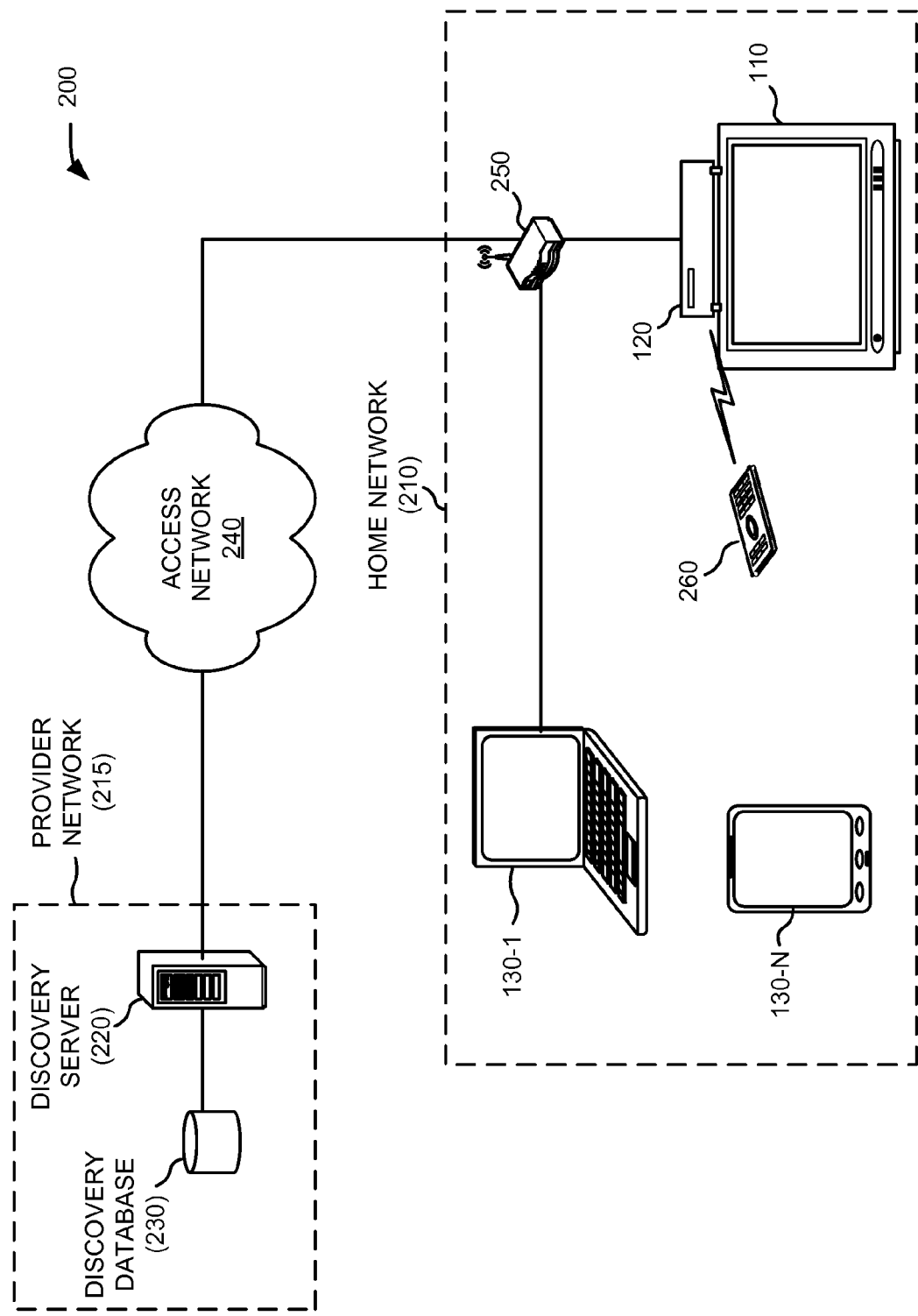
FIG. 2 is a diagram illustrating an exemplary network in which systems and/or methods described herein may be implemented.

FIG. 2 is a diagram illustrating an exemplary network 200 in which systems and/or methods described herein may be implemented. As illustrated, network 200 may include a home network 210, a provider network 215 that includes a discovery server 220 and a discovery database 230, and an access network 240. Home network 210 may include television display 110, STB 120, computing devices 130-1 through 130-N (collectively "computing devices 130" and individually "computing device 130"), a home router 250, and a remote control 260. Components of network 200 may be connected via wired and/or wireless links.

Home network 210 may include one or more devices connected to each other, and/or to access network 240. Devices in home network 210 may include, for example, one or more set-top boxes (e.g., STB 120), local routers (e.g., home router 250), televisions (e.g., television display 110), personal computers (e.g., computing devices 130), and/or mobile devices (e.g., computing devices 130). Home network 210 may also include other networking equipment and/or devices, such as additional media storage devices or routers, cables, splitters, etc. (not shown). In one implementation, home network 210 may support wireless communications (e.g., using IEEE 802.11 standards).

Television display 110 may include any device capable of receiving and reproducing video signals. In one implementation, television display 110 may include a television. In another implementation, television display 110 may include, for example, a display of a stationary communication device (e.g., a computer monitor or a telephone), or a display of a portable communication device (e.g., a mobile telephone or a PDA).

STB 120 may include a device for selecting, obtaining (e.g., from provider network 215), and/or recording content that may be shown or played on video display device 110 or another device. Examples of STB 120 may include a media client, a set-top box, a computer, a cable card, and a portable electronic device. STB 120 may allow a user to alter programming provided to television display 110 (e.g., a channel up or channel down signal) or provide input for interactive menus (e.g., to navigate menu displays or input data) based on a signal from remote control 260. STB 120 may receive a television (or other programming) signal from a backend server (not shown), may convert the signal to a form usable by television display 110, and may transmit the signal to television display 110 for display. In one implementation, STB 120 may be a closed device (e.g., including a hardware/software configuration that is not accessible to the general public) that restricts unauthorized alteration of programming delivered over access network 240.

In one implementation, STB 120 may include a device (e.g., an Internet Protocol (IP)-based device) configured to execute a client application that is capable of communicating with another device (e.g., computing device 130) within a customer premises network (e.g., home network 210) or another device (e.g., discovery server 220) outside the customer premises network (e.g., via access network 240). For example, STB 120 may communicate with discovery server 220 to request discovery information for local devices in home network 210 and may communicate with computing device 130 to initiate media transfers from computing device 130 to STB 120.

Computing device 130 may include a computational or communication device. Computing device 130 may enable a user to send/receive messages, view content, and/or interact with other devices. For example, computing device 130 may include a personal computer (e.g., a laptop or desktop PC), a tablet computer, a smart phone, a gaming system, a personal media player, or other types of computational or communication devices that can communicate with STB 120 and discovery server 220. In one implementation, computing device 130 may include a media server application that automatically provides computing device discovery information (e.g., a local IP address and active port) to discovery server 220 for future use by a corresponding client application (e.g., residing on STB 120) in home network 210. Computing device 130 (e.g., via the server application) may also enable media transfer from computing device 130 to STB 120 for presentation on television display 110.

Home router 250, also referred to as a broadband home router (BHR) or home network gateway (HNG), may act as a hub for communications entering home network 210. For example, discovery server 220 may communicate with one or more devices in a customer's home (e.g., STB 120 or computing devices 130) via access network 240 and home router 250. Similarly, home router 250 may forward communications from devices in a customer's home (e.g., STB 120 or computing devices 130) to discovery server 220 via access network 240. In some implementations, home router 250 may communicate with devices in home network 210 and facilitate communications between devices in home network 210.

Remote control 260 may include a device that allows a user to control programming and/or content displayed on one or more of television displays 110 via interaction with STB 120. Remote control 260 may transmit signals, such as, for example, infrared signals, to a signal receiver associated with television display 110 and/or STB 120. In one implementation, remote control 260 may be used to activate and navigate within a client application that enables media transfer from computing device 130 to STB 120.

Provider network 215 may include network devices that provide backend services to devices in home network 210, including services to enable media transfer from computing device 130 to STB 120. Provider network 215 may include, for example, one or more private IP networks that use a private IP address space. Provider network 215 may include a local area network (LAN), an intranet, a private wide area network (WAN), etc. In one implementation, provider network 215 may implement one or more Virtual Private Networks (VPNs) for providing communication between devices within provider network 215. Provider network 215 may be protected/separated from other networks, such as network 240, by a firewall. Although shown as a single element in FIG. 2, provider network 215 may include a number of separate networks.

Discovery server 220 may include a network device that provides backend support for receiving discovery information from computing devices 130 and distributing discovery records to STB 120. For example, discovery server 220 may receive discovery information from computing device 130 and/or home router 250 and may format a discovery record for storage in discovery database 230. Discovery server 220 may also receive requests (e.g., from STB 120) for discovery records and provide appropriate discovery records to STB 120.

Discovery database 230 may include a database or another data structure to store discovery records and associated metadata that may be used (e.g., by discovery server 220) to respond to requests from STB 120.

Access network 240 may include a video signaling and distribution network and system that permits transfer of data between provider network 215 and STB 120/local router 250. Additionally, access network 240 may include, among other things, a firewall, a filtering mechanism, a proxy, and/or network address translation mechanisms. Access network 240 may include, for example, a single network, such as a WAN, a local area network (LAN), a metropolitan area network (MAN), a telephone network (e.g., a public switched telephone network (PSTN) or a wireless network), the Internet, a satellite network, etc., or a combination of networks. Access network 240 may provide customers with multimedia content provided, for example, by devices in provider network 215. Access network 240 may also support communications between STB 120 and discovery server 220 using, for example, Internet protocol (IP). Although shown as a single element in FIG. 2, access network 240 may include a number of separate networks that function to provide services to devices in home network 210.

In FIG. 2, the particular arrangement and number of components of network 200 are illustrated for simplicity. In practice there may be more home networks 210, discovery servers 220, discovery databases 230, and/or access networks 240. For example, there may be hundreds or thousands of home networks 210.

Figure 3:
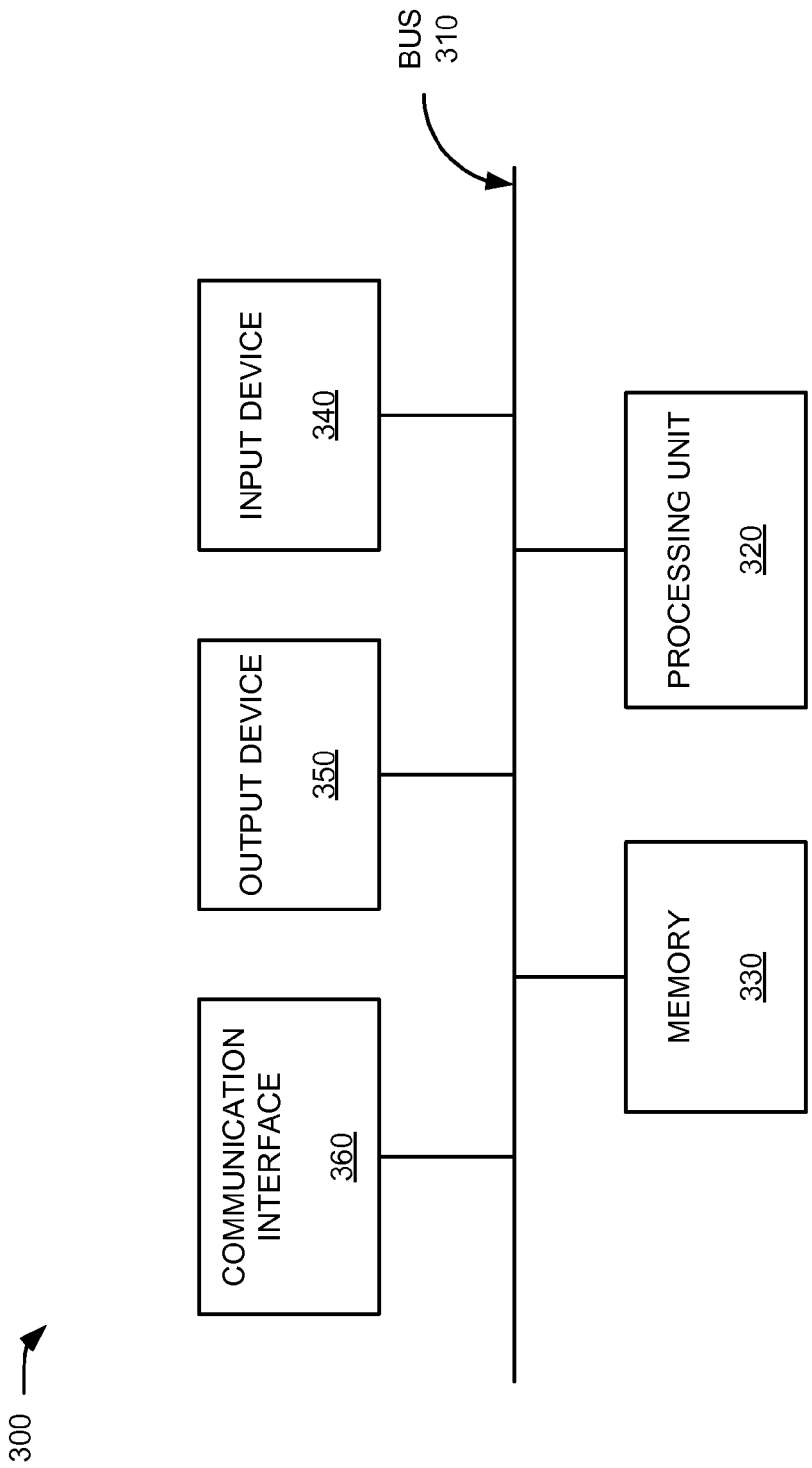
FIG. 3 is a block diagram illustrating exemplary components of a device that may correspond to one of the devices of FIG. 2.

FIG. 3 is a diagram of exemplary components of a device 300. Each of STB 120, computing device 130, and discovery server 220 may be implemented/installed as a combination of hardware and software on one or more of device 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may include a non-transitory memory device. A memory device may be implemented within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

Figure 4:
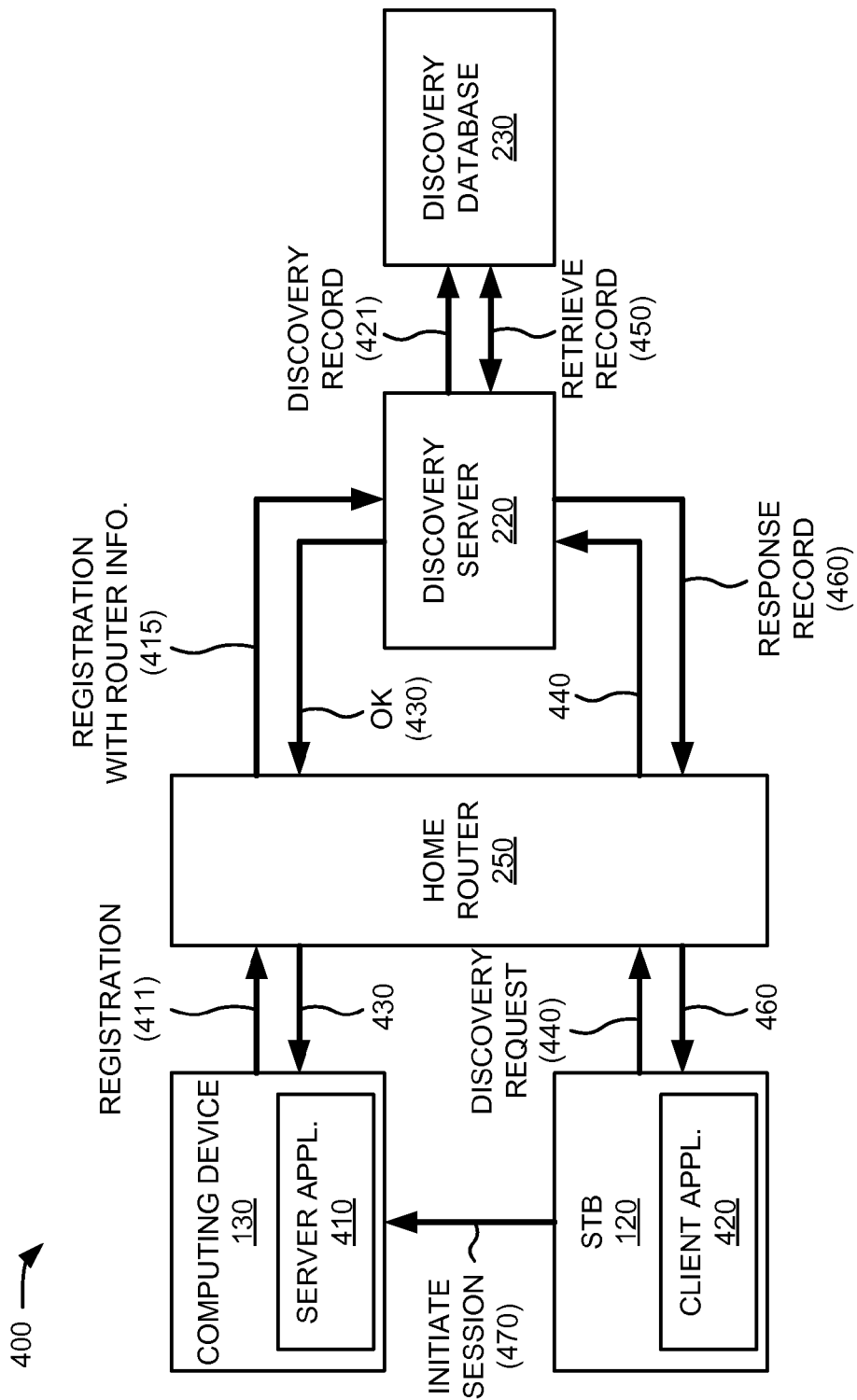
FIG. 4 is a block diagram illustrating exemplary communications between devices in a portion of the network of FIG. 2.

FIG. 4 is a diagram of exemplary communications for a portion 400 of network 200. Communications in FIG. 4 may represent communications to provide device discovery services for media manager applications residing on STB 120. As shown in FIG. 4, network portion 400 may include STB 120, computing device 130, discovery server 220, discovery database 230, and home router 250. STB 120, computing device 130, discovery server 220, discovery database 230, and home router 250 may include functionality described above in connection with, for example, FIGS. 1-3.

As shown in FIG. 4, computing device 130 may include a server application 410. Server application 410 may be obtained, for example, via a download procedure from discovery server 220 or another device in provider network 215. Server application 410 may enable media transfer from computing device 130 to STB 120 (e.g., for presentation on television display 110). Upon installation/activation, server application 410 may cause computing device 130 to send a registration request 411 to discovery server 220 (via home router 250). Registration request 411 may include a local IP address identifying where server application 410 is running and a port on which server application 410 is listening. In one implementation, the communications between computing device 130 and discovery server 220 may be performed using hypertext transfer protocol (HTTP) or secure HTTP (HTTPS). In another implementation, the communications between computing device 130 and discovery server 220 may be performed using another type of protocol.

In accordance with routing protocols, home router 250 may add header information or other indicators that will enable discovery server 220 to identify the IP address of home router 250 (e.g., the WAN address) for user over access network 240. Home router 250 may forward registration request 411 with router information, as indicated by reference number 415.

Discovery server 220 may receive registration request 411 with router information 415 and create a discovery record 421 with the router (WAN) IP address, the local IP address, and the port for server application 410. Discovery server 220 may store discovery record 421 in discovery database 230 for later use. Discovery server 220 may also provide a response 430 to computing device 130 indicating that registration request 411 has been received, processed, and/or stored. While a single discovery record is shown in FIG. 4, discovery records for computing devices 130/multiple server applications 410 may be registered behind home router 250.

STB 120 may include a client application 420 to communicate with server application 410 to enable media transfer from computing device 130 to STB 120 for presentation on television display 110. Client application 420 may be downloaded, for example, from discovery server 220 or another provisioning server (not shown) associated with a service provider network 215. Upon activation of client application 420 by a user (e.g., a user selecting a "media sharing" option from a menu via remote control 260), client application 420 may cause STB 120 to generate a discovery request 440.

Discovery request 440 may request discovery records for server application(s) 410 registered behind home router 250. STB 120 may forward discovery request 440 via home router 250 to discovery server 220. The sending of discovery request 440 (and receipt of a subsequent response from discovery server 220) may be transparent to the user. In one implementation, discovery request 440 may be provided using IP communications. In another implementation, discovery request 440 may be provided via another communication protocol, including in-band or out-of-band communications. In accordance with routing protocols, home router 250 may add header information or other indicators that will enable discovery server 220 to identify the IP address of home router 250 for user over access network 240.

Discovery server 220 may receive discovery request 440 and may query discovery database 230 for discovery record (s) 420 that match the router (WAN) IP address of home router 250. Assuming computing device 130/server application 410 has submitted registration request 411 and that discovery record 421 has been created, discovery server 220 may identify a record with a matching router (WAN) IP address in discovery database 230 and retrieve the corresponding record, as indicted by reference number 450. Discovery server 220 may forward the retrieved record, as response record 460, to client application 420.

Client application 420 may receive response record 460 and may store the information in response record for immediate and/or subsequent communications with computing device 130/server application 410. For example, client application 420 may use the local IP address and port information from response record 460 to initiate a session (e.g., a TCP/IP session) with computing device 130/server application 410, as indicated by reference number 470, to conduct media sharing between computing device 130 and STB 120.

Although FIG. 4 shows exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

FIG. 5 a diagram illustrating a portion of an exemplary data structure 500 that may be used by discovery server 220. Data structure 500 may include records for discovering media server application on devices in home network 210. As shown in FIG. 5, data structure 500 may include a router IP field 510, a local IP field 520, a port field 530, and a variety of entries 540 associated with fields 510-530. Each row of data structure 500 may correspond to discovery record (e.g., discovery record 421) generated in response to a registration request 411.

Router IP field 510 may include the WAN IP address of a home router (e.g., home router 250). Local IP field 520 may include an IP address for computing device 130. Port field 530 may include the port on which server application 410 is listening. As shown in FIG. 5, multiple discovery records (e.g., record nos. 1 and 2) may be registered with the same router IP entry (e.g., "194.223.XX.YY"), indicating multiple devices (e.g., computers 130) with server applications 410 are registered behind the same home router 250 (e.g., in the same home network 210).

Although FIG. 5 shows example fields of data structure 500, in other implementations, data structure 500 may include different fields or additional fields than those depicted in FIG. 5. For example, in other implementations data structure 500 may include a media access control (MAC) address or other identifiers.

Figure 6:
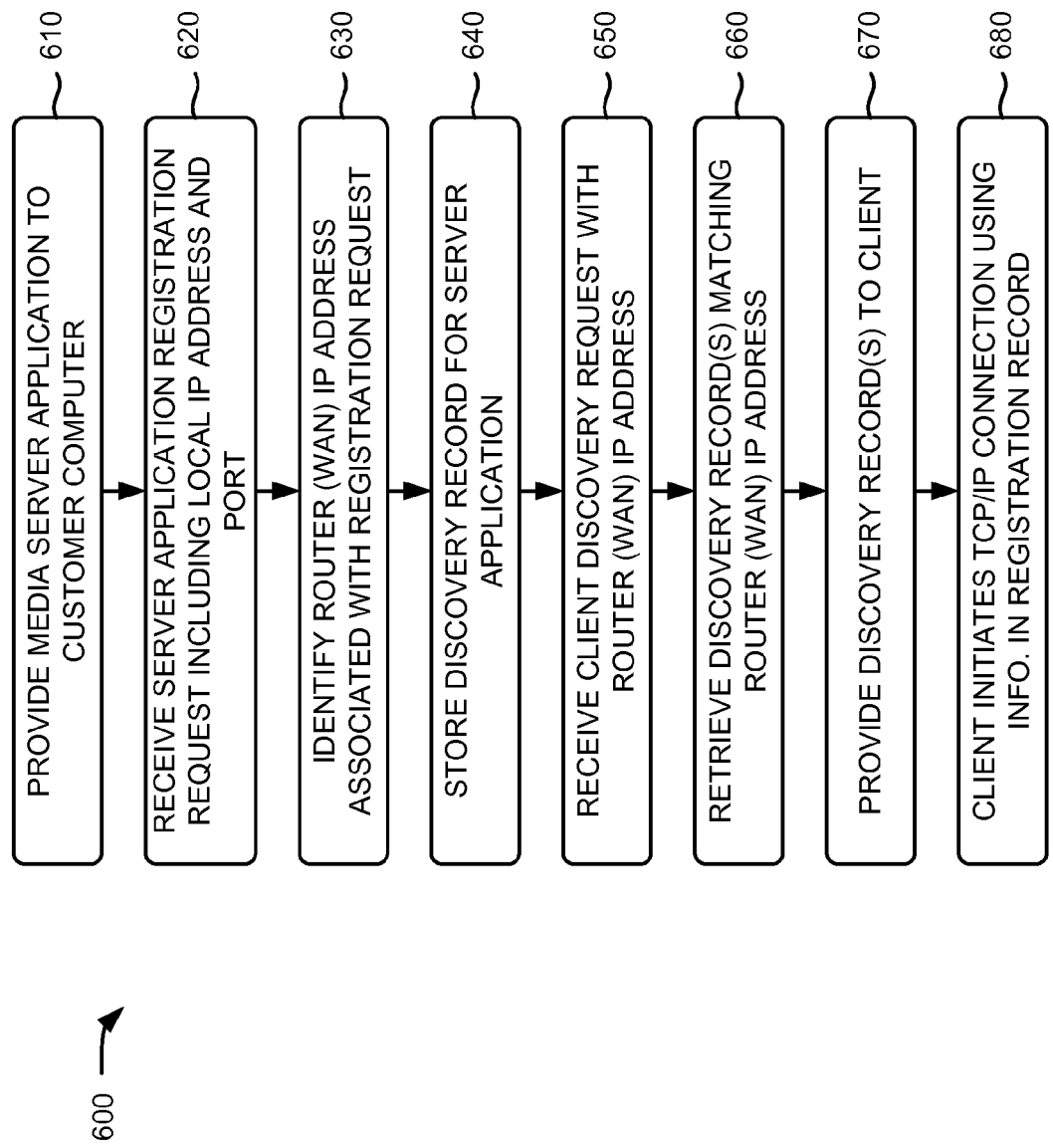
FIG. 6 is a flow diagram of an exemplary process for conducting device discovery according to an implementation described herein.

FIG. 6 is a flow diagram of an exemplary process 600 for conducting device discovery of according to an implementation described herein. In one implementation, process 600 may be performed by discovery server 220. In another implementation, some or all of process 600 may be performed by another device or group of devices, including or excluding discovery server 220. For example, a device in home network 210 may perform one or more parts of process 600.

As shown in FIG. 6, process 600 may include providing a media server application to a customer computer (block 610), receiving a server application's registration request that includes a local IP address and a port (block 620), and identifying a router (WAN) IP address, associated with the registration request (block 630). For example, a device in service provider network 215 may send a server application (e.g., server application 410) to computing device 130. Upon installation/activation of server application 410, server application 410 may cause computing device 130 to send a registration request 411 to discovery server 220 (via home router 250). Registration request 411 may include a local IP address where server application 410 is running and a port on which server application 410 is listening. Home router 250 may add header information or other indicators that will enable discovery server 220 to identify the router WAN IP address. Home router 250 may forward registration request 411 with router information, as indicated by reference number 415.

Process 600 may further include storing a discovery record for the server application (block 640), and receiving a client discovery request with a router (WAN) IP address (block 650). For example, as described above in connection with FIG. 4, discovery server 220 may receive the registration request with router information 415 and create/store a discovery record 421 with the router (WAN) IP address, the local IP address, and the port for server application 410. Upon activation of client application 420, client application 420 may cause STB 120 to generate a discovery request 440. Discovery request 440 may submit to discovery server 220 a request for discovery records for computing device 130/server application(s) 410. In one implementation, home router 250 may add header information to discovery request 440 that will enable discovery server 220 to identify the WAN IP address of home router 250.

Process 600 may further include retrieving one or more discovery records matching the router (WAN) IP address (block 660), providing the one or more discovery records to the client (block 670). For example, as described above in connection with FIG. 4, discovery server 220 may identify a record with a matching router (WAN) IP address in discovery database 230 and retrieve the corresponding record, as indicted by reference number 450. Discovery server 220 may forward the retrieved record, as response record 460, to client application 420.

Process 600 may also include initiating a TCP/IP connection with the server application using information in the registration record (block 680). For example, as described above in connection with FIG. 4, Client application 420 may use the local IP address and port information from response record 460 to initiate a session (e.g., a TCP/IP session) with computing device 130/server application 410.

According to implementations described herein, a server application on a local computing device may provide a registration request to a remote discovery server. The registration request may include a local IP address and a listening port. The discovery server may also determine a router (WAN) IP address based on the registration request and may create a discovery record for the server application. The network device may receive, from a STB within a local network, a discovery request for server applications within the STB's local network. The network device may identify, based on the discovery request, a WAN IP address for the router in the STB's local network and may retrieve, from a database of multiple discovery records, a particular discovery record with an IP address that matches the WAN IP address for the STB's local wireless network. The network device may send, to the STB, the particular discovery record for use in initiating a communication session with the server application. Thus, systems and/or methods described herein may enable non-DLNA compliant client devices, such as legacy STBs, to discover a media server within a home (or local) network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A network device in a remote provider network, comprising:
   a network interface to communicate with one or more remote systems;
   one or more memories to store instructions; and
   one or more processors to execute instructions in the one or more memories to:
      receive, at the remote provider network and from a set-top box that is not compliant with Digital Living Network Alliance (DLNA) standards for device interoperability, a discovery request for a media server application residing on a computing device in a home network, wherein the set-top box and the computing device are within the same home network;
      identify, based on the discovery request, a wide area network (WAN) Internet Protocol (IP) address for a router in the home network;
      retrieve, from a database of multiple discovery records of media server applications, a particular discovery record with an IP address that matches the WAN IP address for the home network, wherein each of the multiple discovery records include a router WAN IP address, a local IP address, and a port for one of the media server applications; and
      send, to the set-top box via the remote provider network, the particular discovery record.

2. The network device of claim 1, wherein each of the multiple discovery records in the database further includes a media access control (MAC) address.

3. The network device of claim 1, wherein the one or more processors are further to execute instructions in the one or more memories to:
   receive, from a user device within another home network, a registration request including a local IP address for the user device and a listening port for another server application residing on the user device;
   identify, based on the registration request, a WAN IP address for another router in the other home network; and
   store, in the database, a new discovery record for the other server application, wherein the new discovery record includes the WAN IP address for the other router, the local IP address for the user device, and the listening port for the other server application.

4. The network device of claim 3, wherein the one or more processors are further to execute instructions in the one or more memories to:
   provide, to the user device, a response indicating that the registration request has been received.

5. The network device of claim 1, wherein, when retrieving the particular discovery record with the IP address that matches the WAN IP address for the home network, the one or more processors are further to execute instructions in the one or more memories to:
   retrieve multiple discovery records that match the WAN IP address for the home network, wherein each of the retrieved multiple discovery records is associated with a different computing device.

6. The network device of claim 1, wherein the particular discovery record is cause a client application on the set-top box to initiate a communication session with the server application on the computing device.

7. A method, comprising:
   sending, by a computing device within a home network and to a network device outside the home network, a discovery record for a media server application residing on the computing device, wherein the discovery record includes a WAN IP address, a local IP address, and a port;
   sending, by a set-top box within the home network and to the network device outside the home network, a discovery request for the media server application residing on a computing device, wherein the set-top box is not compliant with Digital Living Network Alliance (DLNA) digital media standards;
   identifying, by the network device and based on the discovery request, a WAN IP address for a router in the home network;
   generating, by the network device and when the WAN IP address for the router matches the WAN IP address in the discovery record, a response to the discovery request based on the discovery record, wherein the response includes the local IP address and the port;
   receiving, by the set-top box and from the network device, the response; and
   initiating, by the set-top box, a communication session with the media server application based on the local IP address and the port.

8. The method of claim 7, wherein the computing device includes one of:
   a desktop personal computer,
   a laptop personal computer,
   a tablet computer,
   a smart phone,
   a gaming system, or
   a personal media player.

9. The method of claim 7, further comprising:
   storing, in a local memory of the set-top box, the local IP address for the computing device and the port being used by the media server application.

10. The method of claim 7, wherein, when sending the discovery request to the network device, the set-top box uses Internet Protocol.

11. The method of claim 7, wherein the set-top box is a closed device including a hardware or software configuration that is not accessible to the public.

12. The method of claim 7, wherein, when sending the discovery request, the set-top box sends the discovery request without an express instruction from a user.

13. The method of claim 7, further comprising:
   downloading, from the network device outside the home network, a client application to enable communications with the media server application.

14. A method, comprising:
   receiving, by a network device in a provider network and from a computing device within a local network, a registration request including a local Internet Protocol (IP) address for the computing device and a listening port for a media server application residing on the computing device;
   identifying, by the network device and based on the registration request, a wide area network (WAN) IP address for a router in the local network;
   storing, by the network device, a discovery record for the media server application, wherein the discovery record includes the WAN IP address, the local IP address, and the port;
   receiving, by the network device and from a set-top box that is not compliant with Digital Living Network Alliance (DLNA) standards for device interoperability and that is executing a client application within the local network, a discovery request for a media server application within the local network;

identifying, by the network device and based on the discovery request, the WAN IP address for the router in the local network;

retrieving, by the network device, the discovery record with the WAN IP address that matches the WAN IP address for the client application; and sending, by the network device and to the set-top box, the discovery record.

15. The method of claim 14, wherein the discovery record provides information to enable the client application to initiate a TCP/IP session with the media server application via the local network.

16. The method of claim 15, further comprising:
initiating, by the set-top box, a TCP/IP session with the computing device based on the local IP address and the port from the discovery record.

17. The method of claim 14, wherein the computing device is not compliant with Digital Living Network Alliance (DLNA) digital media standards.

18. The method of claim 14, wherein storing the discovery record for the media server application, comprises:
storing the discovery record in a database of multiple other discovery records, wherein at least some of the other discovery records include different WAN IP addresses.

19. The method of claim 14, wherein the registration request is received at the network device via hypertext transfer protocol (HTTP) or secure HTTP (HTTPS).

20. The method of claim 14, further comprising:
providing, to the computing device, a response indicating that the registration request has been received.

* * * * *

UNITED STATES PATENT AND TRADEMARK OFFICE
CERTIFICATE OF CORRECTION

PATENT NO.       : 9,112,810 B2                                      Page 1 of 1
APPLICATION NO.  : 13/613020
DATED            : August 18, 2015
INVENTOR(S)      : Christudass et al.

It is certified that error appears in the above-identified patent and that said Letters Patent is hereby corrected as shown below:

Title Page, Item (75) Inventor is corrected to read:
-- John J. Christudass, Coppell (TX);
    Abhilash Paul, Irving (TX);
    Sunil D. Limbasia, Irving (TX);
    Ravi Penumatsa, Irving (TX);
    Aravind Perumandla, Lewisville (TX);
    Srinivas Tatavarty, Irving (TX) --.

Signed and Sealed this
Fifteenth Day of September, 2015

Michelle K. Lee
*Director of the United States Patent and Trademark Office*